United States Patent [19]

Torget et al.

[11] Patent Number: 6,022,419
[45] Date of Patent: Feb. 8, 2000

[54] HYDROLYSIS AND FRACTIONATION OF LIGNOCELLULOSIC BIOMASS

[75] Inventors: Robert W. Torget, Littleton; Nandan Padukone; Christos Hatzis, both of Denver; Charles E. Wyman, Lakewood, all of Colo.

[73] Assignee: Midwest Research Institute, Kansas City, Mo.

[21] Appl. No.: 08/723,399

[22] Filed: Sep. 30, 1996

[51] Int. Cl.$^7$ .............................. C13K 1/02; C08B 5/04; C12P 19/02; C07G 17/00
[52] U.S. Cl. ................................ 127/37; 127/1; 435/105; 536/56; 536/124; 536/127
[58] Field of Search .......................... 127/1, 37; 435/105; 536/56, 124, 127

[56] References Cited

U.S. PATENT DOCUMENTS

| | | |
|---|---|---|
| 1,014,311 | 1/1912 | Lillie . |
| 1,023,257 | 4/1912 | Lillie . |
| 3,480,476 | 11/1969 | Abbot ......................................... 127/1 |
| 3,787,241 | 1/1974 | Eickemeyer ................................ 127/1 |

(List continued on next page.)

FOREIGN PATENT DOCUMENTS 263661   7/1968   Austria .

OTHER PUBLICATIONS

OFD Biomass Feedstock Pretreatment, Nov. 1998.
"Systematic Design of a Novel Two–Stage Engineering–Scale Dilute Acid Hydrolysis Reactor System," R. Elander et al., National Renewable Energy Laboratory, Biotechnology Center for Fuels and Chemicals, Golden, CO 80401 (date unknown).

*Primary Examiner*—Mark L. Bell
*Assistant Examiner*—Patricia L. Hailey
*Attorney, Agent, or Firm*—Ken Richardson

[57] ABSTRACT

A multi-function process is described for the hydrolysis and fractionation of lignocellulosic biomass to separate hemicellulosic sugars from other biomass components such as extractives and proteins; a portion of the solubilized lignin; cellulose; glucose derived from cellulose; and insoluble lignin from said biomass comprising one or more of the following: optionally, as function 1, introducing a dilute acid of pH 1.0–5.0 into a continual shrinking bed reactor containing a lignocellulosic biomass material at a temperature of about 94 to about 160° C. for a period of about 10 to about 120 minutes at a volumetric flow rate of about 1 to about 5 reactor volumes to effect solubilization of extractives, lignin, and protein by keeping the solid to liquid ratio constant throughout the solubilization process; as function 2, introducing a dilute acid of pH 1.0–5.0, either as virgin acid or an acidic stream from another function, into a continual shrinking bed reactor containing either fresh biomass or the partially fractionated lignocellulosic biomass material from function 1 at a temperature of about 94–220° C. for a period of about 10 to about 60 minutes at a volumetric flow rate of about 1 to about 5 reactor volumes to effect solubilization of hemicellulosic sugars, semisoluble sugars and other compounds, and amorphous glucans by keeping the solid to liquid ratio constant throughout the solubilization process; as function 3, optionally, introducing a dilute acid of pH 1.0–5.0 either as virgin acid or an acidic stream from another function, into a continual shrinking bed reactor containing the partially fractionated lignocellulosic biomass material from function 2 at a temperature of about 180–280° C. for a period of about 10 to about 60 minutes at a volumetric flow rate of 1 to about 5 reactor volumes to effect solubilization of cellulosic sugars by keeping the solid to liquid ratio constant throughout the solubilization process; and as function 4, optionally, introducing a dilute acid of pH 1.0–5.0 either as virgin acid or an acidic stream from another function, into a continual shrinking bed reactor containing the partially fractionated lignocellulosic biomass material from function 3 at a temperature of about 180–280° C. for a period of about 10 to about 60 minutes at a volumetric flow rate of about 1 to about 5 reactor volumes to effect solubilization of cellulosic sugars by keeping the solid to liquid ratio constant throughout the solubilization process.

14 Claims, 4 Drawing Sheets

U.S. PATENT DOCUMENTS

| | | | |
|---|---|---|---|
| 4,432,805 | 2/1984 | Nuuttila et al. | 127/37 |
| 4,615,742 | 10/1986 | Wright | 127/37 |
| 4,706,903 | 11/1987 | Brink et al. | 241/188 R |
| 4,708,746 | 11/1987 | Hinger | 127/37 |
| 4,728,367 | 3/1988 | Huber et al. | 127/1 |
| 4,880,473 | 11/1989 | Scott et al. | 127/37 |
| 4,908,098 | 3/1990 | DeLong | 162/16 |
| 4,941,944 | 7/1990 | Chang et al. | 162/19 |
| 5,125,977 | 6/1992 | Grohmann et al. | 127/36 |
| 5,188,673 | 2/1993 | Clausen et al. | 127/37 |
| 5,366,558 | 11/1994 | Brink | 127/43 |
| 5,389,346 | 2/1995 | Copeland, Jr. | 422/292 |
| 5,424,417 | 6/1995 | Torget et al. | 536/56 |
| 5,503,996 | 4/1996 | Torget et al. | 435/105 |

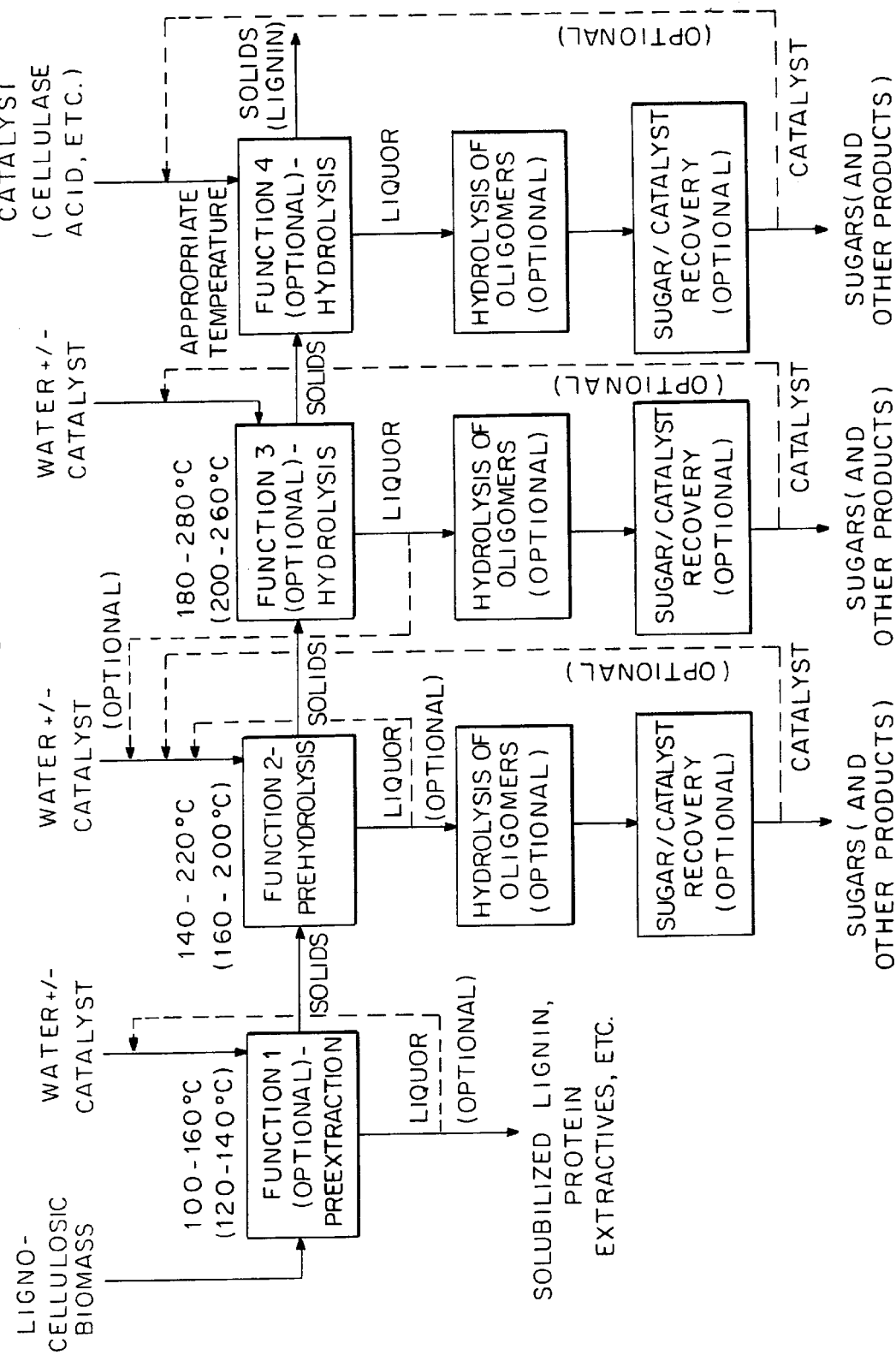

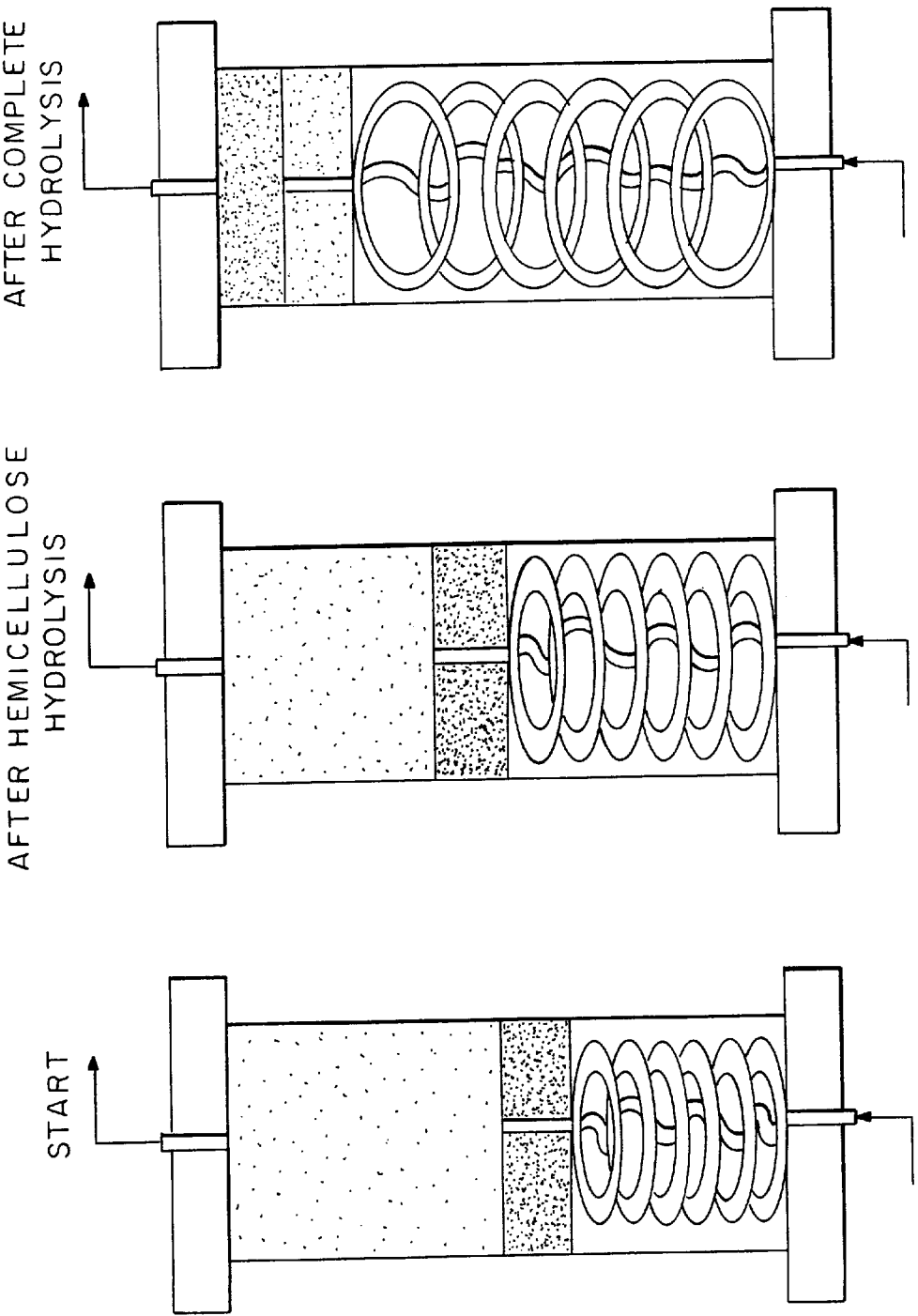

HYDROLYSIS AND FRACTIONATION OF LIGNOCELLULOSIC BIOMASS

CONTRACTUAL ORIGIN OF THE INVENTION

The United States Government has rights in this invention under contract No. DE-AC36-83CH10093 between the United States Department of Energy and the National Renewable Energy Laboratory, a division of the Midwest Research Institute.

BACKGROUND OF THE INVENTION

1. Field of the Invention

The present invention relates to a continuous process of using hot acidic medium for hydrolysis and fractionation of biomass into its major components, in several stages. In the continuous process, a continual shrinking bed reactor may be employed so that, as the biomass is solubilized, the reactor volume per unit feed decreases so as to keep the liquid to solid ratio relatively constant.

The continuous process of using a hot acidic medium for fractionation of biomass components (e.g., hemicellulose and cellulose sugars, lignin, and extractives) provides high yields of sugars, e.g. xylose and glucose.

Utilization of the continual shrinking bed reactor in the fractionation of lignocellulosic biomass so that the liquid to solid ratio is kept relatively constant increases yields of the solubilized sugars and increases concentrations of the released sugars by minimizing the residence time of the liquor fraction in the reactor.

2. Description of the Prior Art

Lignocellulosic biomass which is available in abundance can be used as an inexpensive feed stock for production of renewable fuels and chemicals. Current processes for this conversion involve chemical and/or enzymatic treatment of the biomass to hydrolyze cellulose and hemicellulose into their respective sugars. Enzymatic processes require the use of expensive biocatalysts and have the added burden of transporting lignin-slurries through the entire operating train. Current chemical processes for conversion of lignocellulosic biomass either require expensive chemical recycle or because of the prolonged exposure of the released sugars to the hydrolysis conditions, result in sugar degradation to by products. Accordingly, current processes for producing sugars from lignocellulosic biomass are expensive processes and low cost production of renewable fuels and chemicals using these current processes are not realized.

Further, in current continuous processes for the production of sugars from starch or lignocellulosic biomass, the reactors for hydrolysis of the lignocellulosic feedstocks by acid catalysis to produce carbohydrates for chemicals or fuels use reactor dimensions based on the bulk packing density of the feed material, thereby limiting the yields of solubilized carbohydrates as a function of hydrolysis conditions, and the reactors are expensive due to being designed for the incoming feed, and thus underutilize the entire reactor volume.

U.S. Pat. No. 4,880,473 entails a process for treatment of hemicellulose and cellulose in two different configurations. Hemicellulose is treated with dilute acid in a conventional process. The cellulose is separated out from the "prehydrolyzate" and then subjected to pyrolysis at high temperatures. Further, the process step between the hemicellulose and cellulose reactions require a drying step with a subsequent pyrolysis high temperature step at 400–600° C. for conversion of the cellulose to fermentable products.

U.S. Pat. No. 5,366,558 uses two "stages" to hydrolyze the hemicellulose sugars and the cellulosic sugars in a countercurrent process using a batch reactor, and results in poor yields of glucose and xylose using a mineral acid. Further, the process scheme is complicated and the economic potential on a large-scale to produce inexpensive sugars for fermentation is low.

U.S. Pat. No. 5,188,673 employs concentrated acid hydrolysis which has benefits of high conversions of biomass, but suffers from low product yields due to degradation and the requirement of acid recovery and recycle. Sulfuric acid concentrations used are 30–70 weight percent at temperatures less than 100° C.

An organic solvent for pretreatment of biomass in a counter current process configuration, using a single reactor in which small particles of biomass are introduced from the top and the solvent is contacted in a counter-current fashion from the bottom of the reactor is disclosed in U.S. Pat. No. 4,941,944. The process uses high concentrations (about 80%) of the solvent with a small amount of acid, if needed. The use of a solvent in this process necessitates recovery schemes which are cost-prohibitive insofar as the economics of the process is concerned.

Specific hydrolysis of cellulose by mild treatment with acid followed by treatment with high-pressure steam is disclosed in U.S. Pat. No. 4,708,746; however, the use of high-pressure steam and related capital-intensive equipment does not result in complete hydrolysis.

Biomass hydrolysis of almost exclusively hemicellulose sugars is disclosed in U.S. Pat. No. 4,668,340, wherein acid is introduced countercurrent to the biomass and is removed from each stage to be fed to the next in its sequence. The objective in this patent is to minimize the hydrolysis of cellulose. The objective of this patent (which deals with pre-hydrolysis of a lignocellulosic feed is ultimately to produce a cellulosic pulp containing 94–97% of the feed alpha-cellulose).

Both U.S. Pat. Nos. 5,125,977 and 5,424,417 relate to "prehydrolysis" of lignocellulosic biomass to solubilize the hemicellulosic sugars with concomitant release of some soluble lignin, thereby rendering the remaining cellulose more readily digestible with enzymes or other chemical means—thus these patents disclose only prehydrolysis.

Austrian Patent No. 263,661 discloses dissolution of the three major components of biomass (lignin, hemicellulose and cellulose) in a flow thru reactor using hot compressed water at temperatures between 140–350° C. No yields of the carbohydrate fractions are disclosed in which the carbohydrates are fractionated "cleanly".

U.S. Pat. Nos. 1,014,311; 1,023,257; 3,480,476; 4,728,367; 3,787,241; 4,706,903; 4,645,541; and 5,398,346 disclose various and sundry processes for converting starch or lignocellulosic biomass using an array of reactors; however, none of these patents acknowledge or address any benefits associated with keeping the solid to liquid ratio the same or constant as sugars are solubilized and conveyed out of the reaction zone.

Heretofore, there has not been described a process for complete fractionation of lignocellulosic biomass using a dilute acidic medium in a flow-thru process in which the solid to liquid ratio of the lignocellulosic biomass and hydrolysis liquor has been kept the same or constant as sugars and other biomass components are solubilized and conveyed out of the reaction zone.

SUMMARY OF THE INVENTION

The object of the present invention is to provide a process for hydrolysis to sugars of hemicellulose at high yields.

Another object of the present invention is to provide a process for hydrolysis to sugars of hemicellulose and cellulose at high yields.

Another object of the invention is to provide a process for hydrolysis and fractionation of lignocellulosic biomass into separate streams comprised of relatively pure components.

Another object of the invention is to provide a process for hydrolysis and fractionation of lignocellulosic biomass using dilute acid.

A further object of the invention is to provide a process for hydrolysis and fractionation of lignocellulosic biomass using dilute acid to convert hemicellulose into monomeric sugars at high yields.

A further object of the invention is to hydrolyze hemicellulose into its component sugars at high yields while providing a solid material containing much, if not almost all, of the original cellulose and some of the lignin.

A further object of the invention is to provide a process for hydrolysis and fractionation of lignocellulosic biomass using dilute acid to convert cellulose into monomeric sugars at high yields.

A further object still of the process of the invention is to provide a continuous process for complete hydrolysis and fractionation of lignocellulosic biomass with dilute acid in a reactor configuration that minimizes the time the liquid or hydrolysis liquor spends in the reaction zone.

A further yet object of the invention is to provide a process for hydrolysis and fractionation of lignocellulosic biomass using dilute acid wherein higher yields of solubilized sugars are obtained in higher concentrations.

A further object yet still of the present invention is to provide a process for hydrolysis and fractionation of lignocellulosic biomass utilizing a continual shrinking bed reactor that minimizes the liquid to solid ratio while still insuring good liquid/solid contacting, as biomass components are solubilized and conveyed out of the reaction zone.

To achieve the hydrolysis and fractionation of lignocellulosic feedstocks to produce high yields of soluble sugars for fermentation to final products at high productivity, the invention utilizes a series of flow-through co-current, counter-current, or stand-alone stages which enable efficient contact of dilute acid and biomass, thereby separating solubilized components from the solid.

The fractionation is composed of up to four function elements linked co-currently, countercurrently, or as independent single pass units, depending upon whether the solubilized components are to be mixed or separated from other solubilized components from other functions. All functions can contain one or more stages or sets of operational parameters, and all stages employ the shrinking bed concept, which means that the reactor dimensions as a function of solubilization of the biomass, confer a minimal liquid to solid ratio that still promotes good liquid-solid contacting throughout the fractionation process.

Function 1 or pre-extraction (which is optional) is designed to solubilize the most easily dissolved components such as some lignin, extractives, and any protein; separate stages may be used to fractionate these three components. Function 2 or prehydrolysis is devised to hydrolyze and fractionate most if not all hemicellulosic sugars along with some lignin. Again, several stages may be utilized to optimize the desired fractionation, and these stages may be counter current, co-current, and either independent of function 1 or connected to function 1. If break down of cellulose is desired, function 3 or hydrolysis will be used to primarily hydrolyze a portion or all of the crystalline cellulose, depending on the yields of glucose derived from this function. The yields will depend on the shrinkage of the bed as well as other variables. Again, this function may be linked counter-currently or co-currently with down stream functions, depending on the desired fractionation scenario. Function 4 or hydrolysis is a continuance of function 3 in that cellulose is the object of further solubilization. This function can use harsher severity to solubilize the remaining cellulose. Alternatively, a cellulase system can be used to solubilize the remaining cellulose, replacing either or both functions 3 and 4.

Fresh make-up acid is added, as needed, between the various process stages. Operating conditions are selected in order to maximize the sugar yield from biomass and to limit product degradation.

Alternatively, fresh acid may be added to each stage and the sugar-rich liquid streams exiting each stage may be pooled to provide the feed to the fermentation stage. This minimizes exposure of the soluble sugars to acid and high temperature which promote their degradation. Wash water may also be introduced into the reactors to improve sugar recovery. The solid product of the process will be primarily insoluble lignin which may be used as a boiler fuel or chemical feedstock. The liquid product which contains sugars, hydrolysis by products and lignin breakdown-compounds may be sent to fermentation directly or to a separation process for removal of the non-sugar components. The removal of toxic compounds such as furfural, acetic acid and phenolics by separation affords an opportunity to increase fermentation productivity. The process of the invention produces sugars from lignocellulosic biomass as an inexpensive, versatile raw material for economical production of renewable fuels and chemicals.

Further, because the process of the invention utilizes a continual shrinking bed reactor wherein physical changing of the reactor dimensions as a function of solubilization of the feed stock relative to the bulk packing density of the fresh biomass feed, affects an increased linear flow rate of the hydrolysis liquor using a constant volumetric flow, the residence time of the liquor fraction as a function of position in the reactor results in increased yields of the solubilized sugars and increased concentrations of released sugars.

BRIEF DESCRIPTION OF THE DRAWINGS

FIG. 1 is a flow chart depicting fractionation composed of up to four function elements linked co-currently, countercurrently, or as independant single pass units, depending upon whether the solubilized components are to be mixed or separated from other solubilized components from other functions.

FIG. 3a is a schematic showing a bench-scale continual shrinking bed reactor at the beginning or start of the reaction process of the invention.

FIG. 3b is a schematic of a bench-scale continual shrinking bed reactor of the invention after hemicellulose hydrolysis.

FIG. 3c is a schematic of a bench-scale continual shrinking bed reactor of the present invention after complete hydrolysis of the lignocellulosic biomass.

DETAILED DESCRIPTION OF THE INVENTION

The invention provides an efficient method for hydrolysis and fractionation of lignocellulosic biomass and converts it at very high yields to soluble sugars which may be fermented to the final product at high productivity, as opposed to the use of dilute acid for primarily hydrolyzing hemicellulose exclusively or for complete hydrolysis using concentrated acid.

The invention consists of a series of co-current, counter-current or single pass, isolated stages which enable efficient contact of dilute acid (or hot water in Function 1) and biomass. Now, referring to FIG. 1, the fractionation is composed of up to four function elements linked co-currently, countercurrently, or as single pass units, depending upon whether the solubilized components are to be mixed or separated from other solubilized components from other functions. All functions can contain one or more stages or sets of operational parameters, and all stages employ the shrinking bed concept which means that the reactor dimensions as a function of solubilization of the biomass, substantially confer a constant liquid to solid ratio throughout the reaction.

Figure 2C:
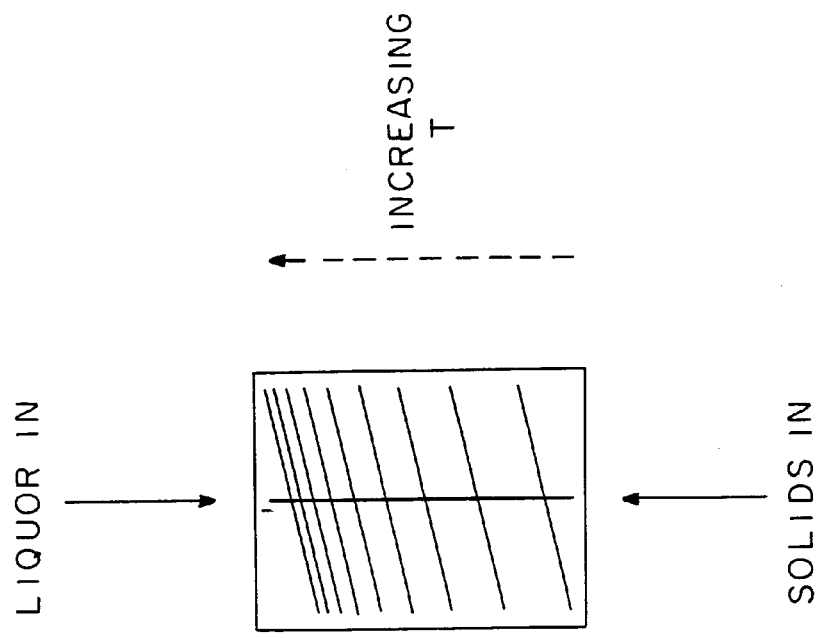
FIG. 2c is a continual shrinking bed reactor wherein the reactor is a vertical screw reactor which conveys the solids co-current or counter-current to the liquor feed. The design criteria is such that the volume of each screw flight decreases as the biomass is solubilized so as to keep the solid to liquid ratio nearly constant.
Figure 2A:
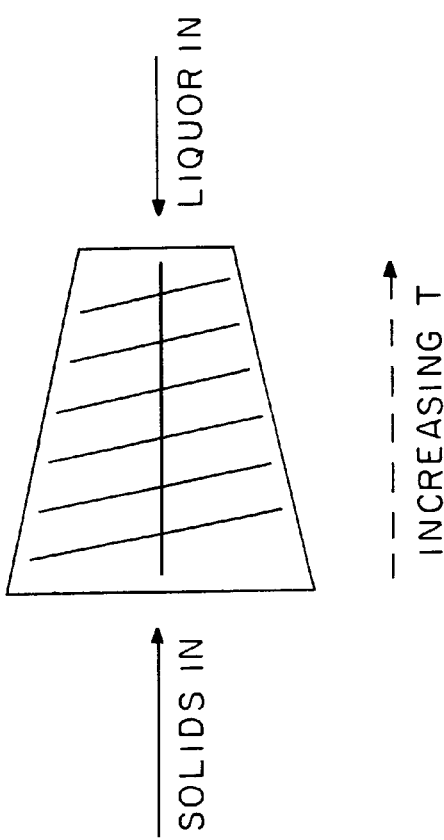
FIG. 2a is a continual shrinking bed reactor wherein a conical shaped flow-thru reactor in which the solids are conveyed towards the narrow end. As the biomass is solubilized, less and less reactor volume is needed to contain a given feed volume. As the volume of the reactor decreases, the linear velocity of the liquor increases even though the volumetric flow rate remains constant. Thus, as the biomass is solubilized, the reactor volume decreases so as to keep the solid to liquid ratio nearly constant.
Figure 2B:
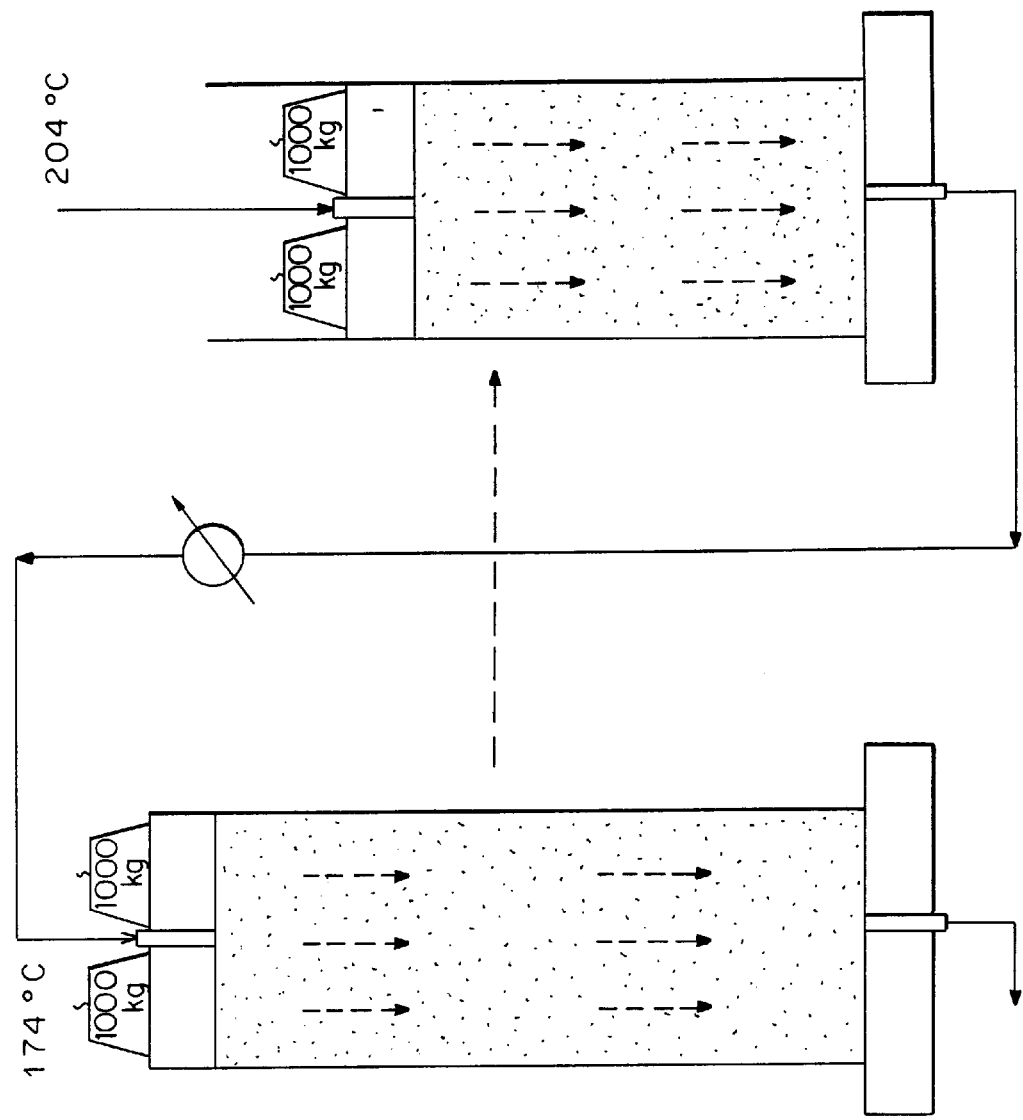
FIG. 2b is a continual shrinking bed reactor showing a cylindrical flow-thru reactor with a piston. As the biomass is solubilized, the piston is activated so as to decrease the reactor volume and thereby keep the solid to liquid ratio nearly constant. Thus, the linear flow rate as a function of solubilization of biomass increases even though the volumetric flow remains unchanged.

Function 1, if desired, is designed to solubilize some lignin, extractives, and protein. Different stages may be used to fractionate components from this function. Hot aqueous medium (100–160° C., preferably 120–140° C. and pH 1.0–5.0, preferably pH 1.3–3.0) in a flow-through mode is used to solubilize some lignin, protein, and extractives. As mass is solubilized, the reactor confers upon the biomass a substantially constant solid to liquid ratio (see FIGS. 2a–c). Carbohydrates are not solubilized to any appreciable extent in this function.

Function 2 is designed to solubilize the hemicellulosic sugars at high yields and concentrations as well as some lignin and easily hydrolyzable glucan. Hot acidic medium (140–220° C., preferably 160–200° C. and pH 1.0–5.0, preferably pH 1.3–3.0) in a flow-through mode is used to solubilize the desired components. As mass is solubilized, the reactor again confers upon the biomass a constant solid to liquid ratio (see FIGS. 2a–c). Crystalline cellulose is not solubilized to an appreciable extent in this function. Again, several stages may be utilized to optimize the desired fractionation, and these stages may be counter current, co-current, or stand alone. This function can be physically linked with function 1 or separate from function 1 depending upon the desired fractionation. The solubilized hemicellulosic sugars may be predominantly in oligomeric form. Therefore, a temperature hold step or enzymatic hydrolysis step may be needed to convert the oligomers to monomers, after which the stream may be sent to a acid catalyst/sugar recovery step, or further refining or product conversion steps.

Function 3, if desired, is designed to solubilize all or a major portion of the crystalline cellulose. Hot acidic medium (180–280° C., preferably 200–260° C. and pH 1.0–5.0, preferably pH 1.3–3.0) in a flow-through mode is used to solubilize the desired components. As mass is solubilized, the reactor again confers upon the biomass a constant solid to liquid ratio (see FIGS. 2a–c). Again, several stages may be utilized to optimize the desired fractionation, and these stages may be counter current, co-current, or stand alone. Because the biomass structure collapses in this function and the mass and heat transfer characteristics may become a limiting factor in yield of solubilized glucose, the solubilization of all crystalline cellulose may not be prudent. Again, oligomeric carbohydrates may exist in the liquor stream and a temperature hold or enzymatic step may be necessary to produce monomeric sugars for product conversion.

Function 4, if desired, is designed to solubilize any remaining cellulose if mass and heat transfer limitations affect yields of glucose from function 3 due to physical changes in the biomass during function 3 fractionation. This function may use a co-current or counter-current reactor configuration with the acidic medium of pH 1.0–5.0 (preferably 1.0–2.5) and temperatures of 180–280° C.

An enzyme catalyst may be used to replace functions 3 and/or 4 for hydrolysis of cellulose. Functions 2–4 can incorporate a sugar recovery step or could all be linked counter-currently to produce higher sugar concentrations. These steps may be used together or any one of them linked with other approaches to carry out these functions. If fractionation of individual sugars such as glucose and xylose is important, a straight flow of hydrolysis medium would be employed in one or more of the individual functions with no physical link between the functions. If cellulose is the desired product, functions 3 and 4 or their enzymatic counterpart would not be performed and the solid material resulting from functions 1 (if used) and 2 would be a desired product, perhaps after further treatment to remove much of the remaining lignin.

During the hydrolysis process, fresh make-up acid can be added, as needed, between the various process stages. Operating conditions are selected in order to maximize the sugar yield from biomass and to limit product degradation. Alternatively, fresh acid may be added to each stage and the sugar-rich liquid streams exiting each stage may be pooled to provide the feed to the fermentation stage. This minimizes exposure of the soluble sugars to acid and high temperature which are known to promote their degradation. Wash water may also be introduced into the reactor to improve sugar recovery. The solid product of the process will be primarily insoluble lignin, which may be used as boiler fuel. On the other hand, the liquid product of the process contains sugars, hydrolysis by products and lignin breakdown compounds, and these materials may be sent to fermentation directly or to a separation process for removal of the non-sugar components. The removal of toxic compounds from the process, such as furfural, acetic acid and phenolics by separation affords an opportunity to increase fermentation productivity.

Accordingly, the invention process produces sugars from lignocellulosic biomass as an inexpensive, versatile raw material for economical production of renewable fuels and chemicals.

The example hereinafter provided will serve to further illustrate the complete hydrolysis of lignocellulosic biomass using dilute acid in a flow-thru process in which a continual shrinking bed reactor design maintains the same solid to liquid ratio during the hydrolysis of the lignocellulosic biomass.

EXAMPLE

Reference is made to Torget et al., (1996), "Optimization of Reverse-flow, Two-Temperature, Dilute-Acid Pretreatment to Enhance Biomass Conversion to Ethanol", Appl Biochem. Biotechnol., 57/58 85–101. The flow-thru reactor of the foregoing Torget et al. reference was modified as follows:

An 8 inch spring, coated with teflon and made of carbon steel with a 7 lb/inch spring tension, was inserted into the reactor which had a 6 inch packing of yellow poplar sawdust and a ¾ inch teflon plug with a titanium (20 micron) exit frit. The inlet to the reactor was connected to the bed by a teflon coiled connecting tube. Both ends of the tube were connected via swage lock fittings. The bottom of the reactor had a 1.75 inch spacer plug to allow the spring (when totally extended) to occupy the entire volume of the reactor. In operation, as the solids are hydrolyzed, the spring compresses the bed so as to keep a constant solid to liquid ratio, thereby increasing the relative linear velocity of the liquid feed relative to the original solid's volume, while keeping the volumetric flow constant.

The reactor was packed with 92.05 g moist yellow poplar saw dust to a height of 6 inches of the 12 inch reactor. The spring assembly with the teflon feed tube was inserted and the reactor fully assembled (FIG. 3). The reactor was connected to the flow thru system (Torget et al., 1996), and placed in a 176° C. sand bath and brought up to 150° C., as measured by a thermocouple located ½ inch from the top of the reactor.

Dilute sulfuric acid (0.07 wt %) was then pumped in at 70 ml/min for 10 minutes to solubilize the easily hydrolyzable xylan, after which the pump was shut off. The spring caused a collapse of the bed volume, of 25%. The reactor was then placed in a 227° C. sand bath for five minutes to heat the reactor contents to approximately 210° C. 70 ml/min of the dilute acid was then pumped for 30 minutes to hydrolyze the remaining xylan, all of the glucan, and 70% of the Klason lignin. The entire bed collapsed to 8% of its total height. The pump was then shut off and the reactor disconnected and cooled.

The mass balance results indicated that 70% of the lignin was solubilized with a mass balance closure on the lignin of 97%. Xylan was solubilized totally with 97% recovered as monomeric and oligomeric xylose in the liquor and 2.9% furfural. Glucan was solubilized totally with a 92% recovery as monomeric and oligomeric glucose with 5% of the glucan recovered as HMF. The other minor sugars were recovered in yields in excess of 90%.

The very high sugar recoveries in the liquor are due to the decreased residence time of the liquor as a function of decreased volume of the 225° C. reactor as a function of the continual shrinking bed mechanism in the reactor.

We claim:

1. A multi-function process for hydrolysis and fractionation of lignocellulosic biomass to separate hemicellulosic sugars from other biomass components comprising extractives and proteins; a portion of a solubilized lignin; cellulose; glucose derived from cellulose; and insoluble lignin from said biomass comprising: A) introducing a dilute acid liquid of pH 1.0–5.0 into a continual shrinking bed reactor containing either solid fresh biomass or solid partially fractionated lignocellulosic biomass material at a temperature of from about 140 to about 220° C. for a period of about 10 to about 60 minutes at a volumetric flow rate sufficient to keep the solid and liquid at a constant ratio throughout said process so as to increase the linear velocity, keep a constant volumetric flow rate to effect solubilization of hemicellulosic sugars and amorphous glucans, to improve hemicellulosic sugar yields.

2. The process of claim 1 wherein said flow rate is from about 1 to about 5 reactor volumes.

3. The process of claim 2 wherein said dilute acid is a mineral acid.

4. The process of claim 3, wherein said mineral acid is selected from the group consisting of sulfuric acid, phosphoric acid or nitric acid.

5. The process of claim 4 wherein said dilute acid is carbonic acid.

6. The process of claim 3 wherein said mineral acid is introduced in stages.

7. The process of claim 2 wherein the continual shrinking bed reactor is a conical shaped flow-thru reactor in which the lignocellulosic biomass is conveyed as a solid toward a narrower end of the conical shaped flow-thru reactor.

8. The process of claim 2 wherein the continual shrinking bed reactor is a series of flow-thru reactors of decreasing volumetric capacity in which the solids are moved from a larger capacity reactor to a smaller capacity reactor as a function of the hydrolysis and/or fractionation of the biomass.

9. The process of claim 2 wherein the continual shrinking bed reactor is a cylindrical flow-thru reactor comprising an activated piston or weighted internal movable top to decrease reactor volume as hydrolysis progresses.

10. The process of claim 2 wherein the continual shrinking bed reactor is a screw reactor that conveys lignocellulosic solids co-current to the acid hydrolysis liquor feed.

11. The process of claim 10, wherein said screw reactor conveys lignocellulosic solids counter-current to the acid hydrolysis liquor feed.

12. The process of claim 2 wherein prior to step A), a dilute acid liquid of about pH 1.0–5.0 is introduced into a continual shrinking bed reactor containing a solid lignocellulosic biomass material at a temperature of from about 94 to about 160° C. for a period of about 10 to about 120 minutes at a volumetric flow rate of from about 1 to about 5 reactor volumes to effect solubilization of extractives, lignin, and protein while keeping the solid to liquid ratio constant throughout the solubilization process.

13. The process of claim 12, subsequent to step A), a liquid dilute acid pH 1.0–5.0 is introduced into a continual shrinking bed reactor containing a solid partially fractionated lignocellulosic biomass material from step A) at a temperature of from about 180–280° C. for a period of about 10 to about 60 minutes and at a volumetric flow rate of 1 to about 5 reactor volumes to effect solubilization of cellulosic sugars while keeping the solid to liquid ratio constant throughout the solubilization process.

14. The process of claim 13 wherein, as a last step, a liquid dilute acid of pH 1.0–5.0 is introduced into a continual shrinking bed reactor containing a solid partially fractionated lignocellulosic biomass material at a temperature of from about 180–280° C. for a period of about 10 to about 60 minutes at a volumetric flow rate of about 1 to about 5 reactor volumes to effect solubilization of cellulosic sugars while keeping the solid to liquid ratio constant throughout the solubilization process.

* * * * *